(12) United States Patent
Tsai et al.

(10) Patent No.: US 8,441,276 B2
(45) Date of Patent: May 14, 2013

(54) SOLAR PHOTOVOLTAIC PANEL TEST PLATFORM

(75) Inventors: Feng-Chin Tsai, Taipei County (TW); Tsai-Chung Liu, Taipei County (TW)

(73) Assignee: Tungnan University, Taipei County (TW)

( * ) Notice: Subject to any disclaimer, the term of this patent is extended or adjusted under 35 U.S.C. 154(b) by 417 days.

(21) Appl. No.: 12/956,361

(22) Filed: Nov. 30, 2010

(65) Prior Publication Data

US 2012/0133372 A1  May 31, 2012

(51) Int. Cl.
*G01R 31/26* (2006.01)
*G01R 31/00* (2006.01)

(52) U.S. Cl.
USPC ...................................... 324/761.01; 324/501

(58) Field of Classification Search ............. 324/761.01, 324/501
See application file for complete search history.

(56) References Cited

U.S. PATENT DOCUMENTS

| 8,201,994 B2 * | 6/2012 | Hebert et al. .................. 374/57 |
| 2009/0119060 A1 * | 5/2009 | Simburger et al. ........... 702/150 |

* cited by examiner

*Primary Examiner* — Amy He
(74) *Attorney, Agent, or Firm* — WPAT, P.C.; Anthony King

(57) ABSTRACT

A solar photovoltaic panel test platform includes a test section and a signal processing section. The test section has a frame, a light-emitting unit disposed on the frame, a first angle adjustment unit and a second angle adjustment unit arranged on the frame, an air-cooling unit mounted on the first angle adjustment unit for connecting with a first solar photovoltaic panel, and a water-cooling unit mounted on the second angle adjustment unit for connecting with a second solar photovoltaic panel. The signal processing section is connected to the first and second angle adjustment units, the light-emitting unit, the air-cooling unit, the water-cooling unit, and the first and second solar photovoltaic panels. The signal processing section serves to receive sensing signals and transmit control signals. The solar photovoltaic panel test platform can provide different illuminations, angles of incidence and heat dissipation modes to test the efficiency of the solar photovoltaic panels.

14 Claims, 10 Drawing Sheets a b

SOLAR PHOTOVOLTAIC PANEL TEST PLATFORM

FIELD OF THE INVENTION

The present invention relates generally to a solar photovoltaic panel test platform, and more particularly to a solar photovoltaic panel test platform, which can provide different illuminations, angles of incidence and heat dissipation modes to test the efficiency of solar photovoltaic panels.

BACKGROUND OF THE INVENTION

It is known that global environmental pollution and ecological devastation problems have become more and more serious. According to the "Rio Declaration on Environment and Development" and "the United Nations Framework Convention on Climate Change" passed by the World Commission on Environment and Development held in Rio de Janeiro, Brazil, anew model of lasting development and application of energy has been established. Especially, the utilization of solar energy is popularly encouraged. The utilization of solar energy has been tightly bonded with international environmental protection. In addition, in the World Solar Energy Summit Conference held by United Nations in Republic of Zimbabwe in 1996, Declaration on Development of Solar Energy was issued and many important treaties such as "International Solar Energy Convention" and "1996-2005 Solar Energy Ten Years Action Project" are regulated to claim the concrete determination of United Nations and all the countries over the world of development of solar energy. In the Conference, these countries are also demanded to transfer technologic achievement together into practical production so as to develop solar energy industries and widely utilize endless solar energy supply.

Conventionally, the test of efficiency of solar photovoltaic panel is performed on a horizontal face. A xenon light with fixed power is used to perpendicularly be projected upon the solar photovoltaic panel to simulate sunshine for measuring voltage and current to obtain efficiency curve. According to such measure, only a fixed solar photovoltaic panel can be tested, while the efficiency change of a solar photovoltaic panel in an inclined state under the different surface temperatures can be hardly tested.

It is therefore tried by the applicant to provide a solar photovoltaic panel test platform, which can provide different illuminations, angles of incidence and heat dissipation modes to test the efficiency of solar photovoltaic panels.

SUMMARY OF THE INVENTION

A primary object of the present invention is to provide a solar photovoltaic panel test platform including a test section and a signal processing section. With the test section and the signal processing section, the solar photovoltaic panel test platform can simulate the illuminations and angles of incidence of the sun for the orientation limit of the building and adjust heat dissipation amount. Accordingly, the efficiency of solar photovoltaic panels can be tested in different illuminations, angles of incidence and heat dissipation modes.

According to the above and other objects, the solar photovoltaic panel test platform of the present invention includes a test section and a signal processing section. The test section has a frame, at least one light-emitting unit disposed at a top end of the frame, a first angle adjustment unit and a second angle adjustment unit arranged on the frame, an air-cooling unit mounted on the first angle adjustment unit for connecting with a first solar photovoltaic panel, and a water-cooling unit mounted on the second angle adjustment unit for connecting with a second solar photovoltaic panel. The signal processing section is connected to the first angle adjustment unit, the second angle adjustment unit, the light-emitting unit, the air-cooling unit, the water-cooling unit, the first solar photovoltaic panel and the second solar photovoltaic panel. The signal processing section serves to receive sensing signals and transmit control signals.

Accordingly, the solar photovoltaic panel test platform can provide different illuminations, angles of incidence and heat dissipation modes to test the efficiency of the solar photovoltaic panels.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
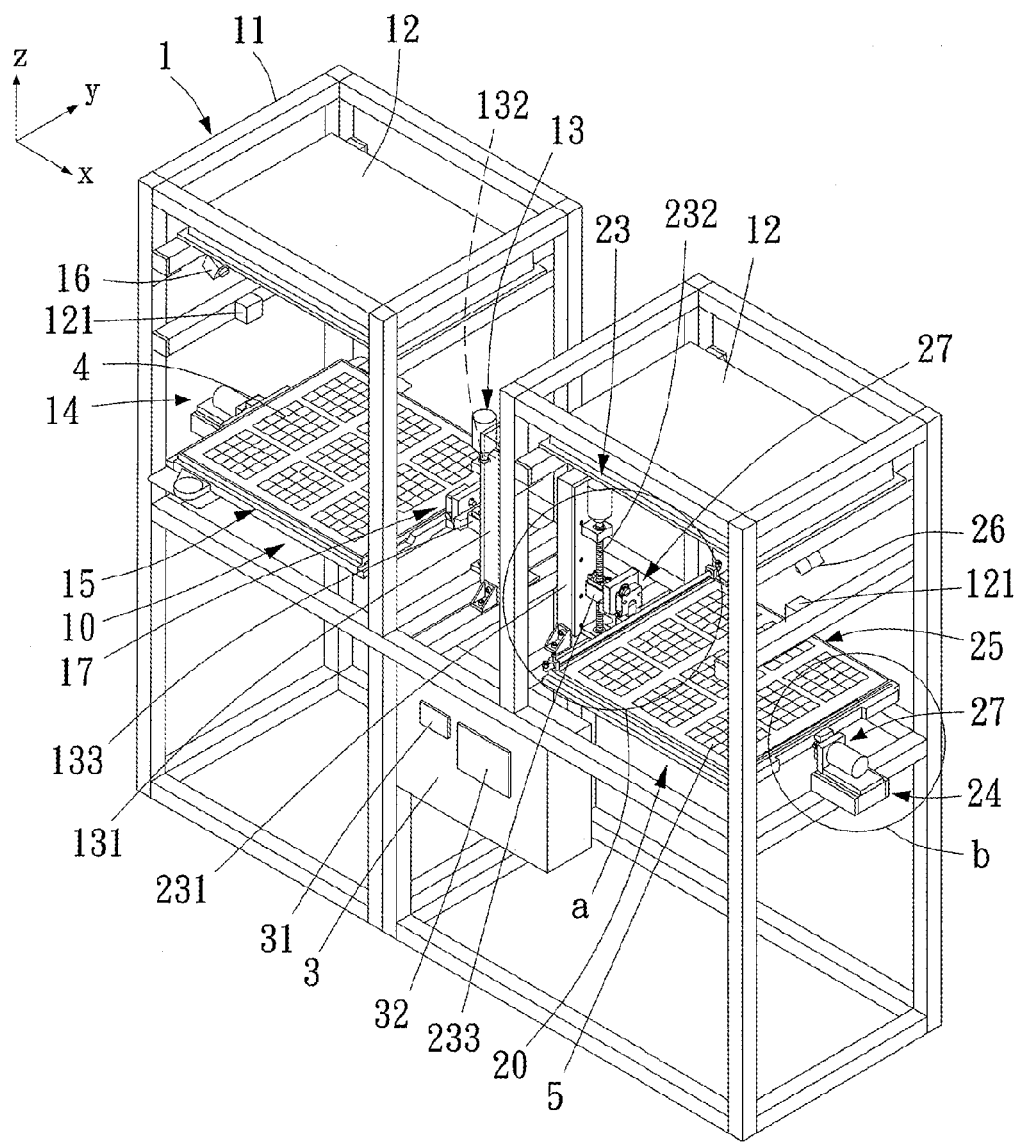
FIG. 1 is a perspective view of a preferred embodiment of the present invention.
Figure 2:
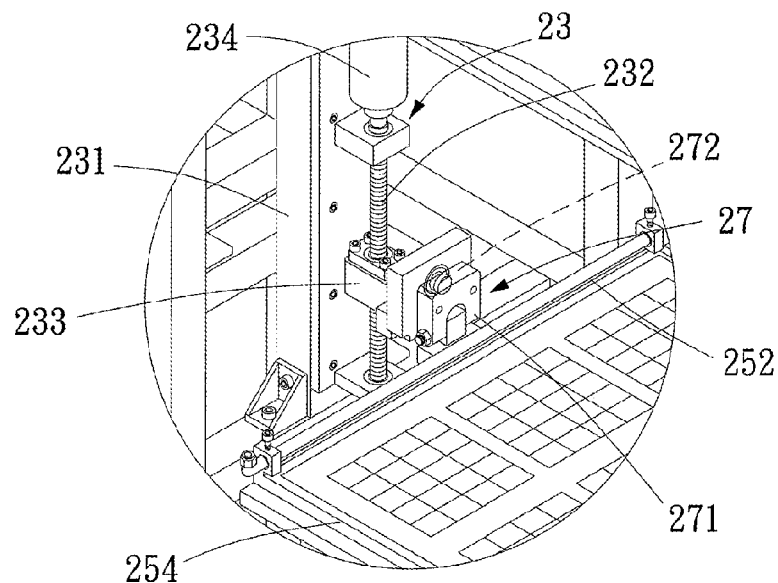
FIG. 2 is an enlarged view of circled area a of FIG. 1.
Figure 3:
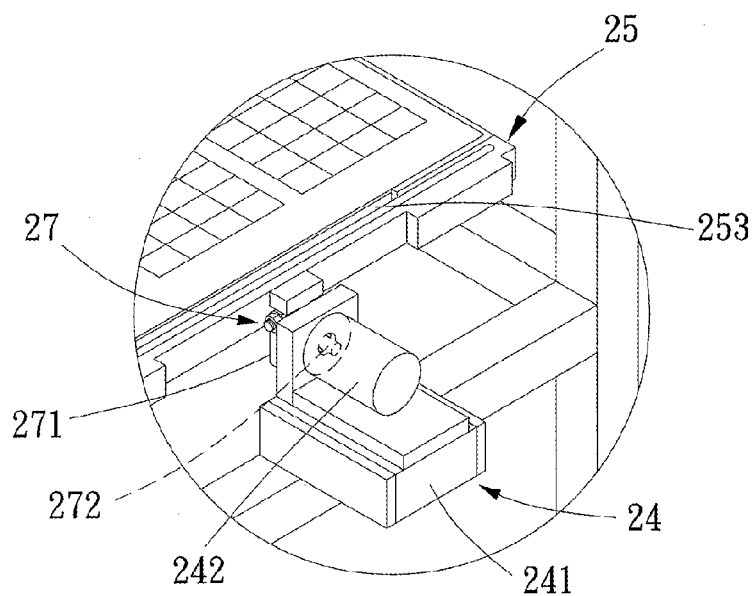
FIG. 3 is an enlarged view circled area b of FIG. 1.
Figure 4:
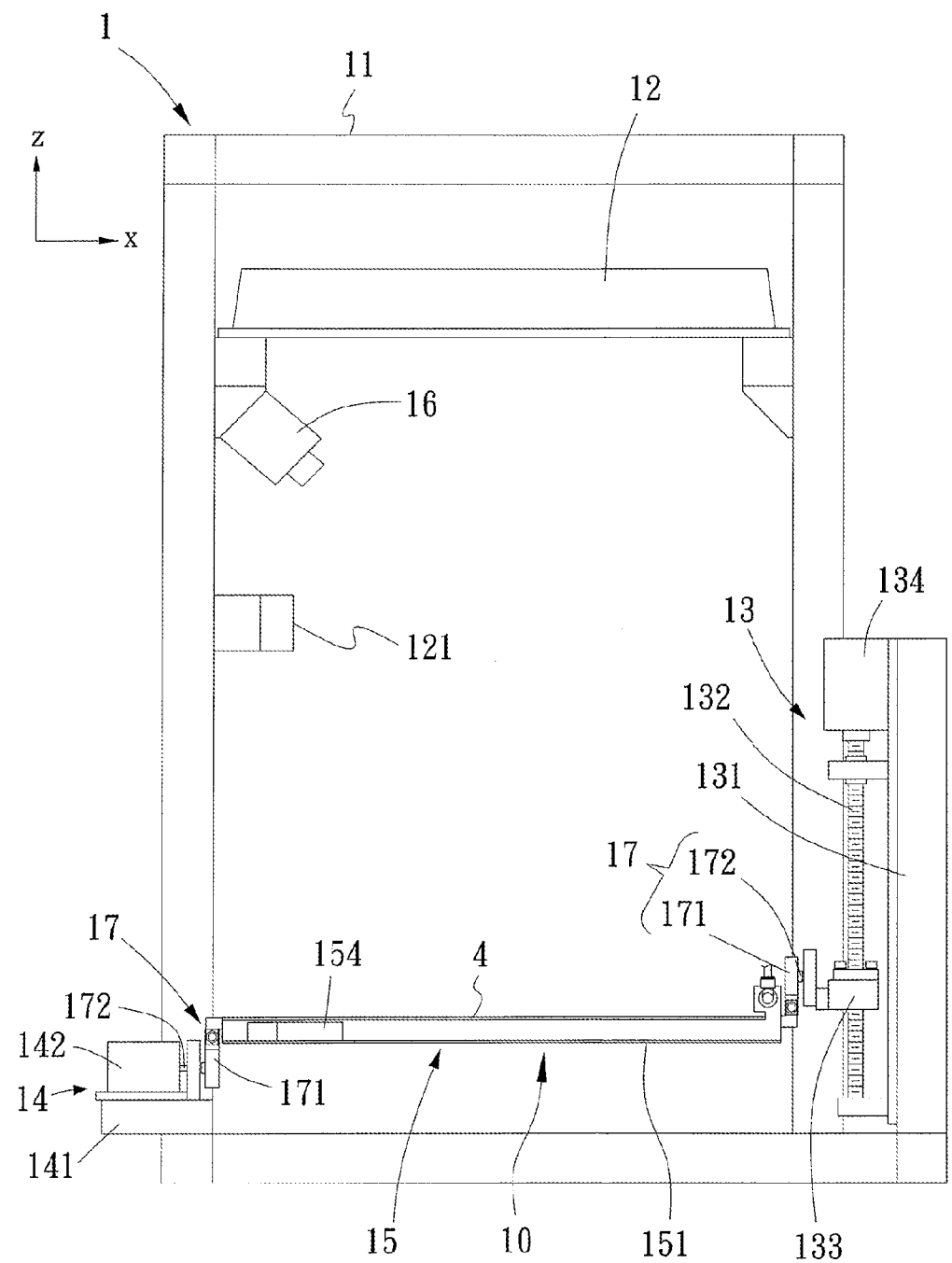
FIG. 4 is a side view of the preferred embodiment of the present invention, showing an air-cooling system thereof.
Figure 5:
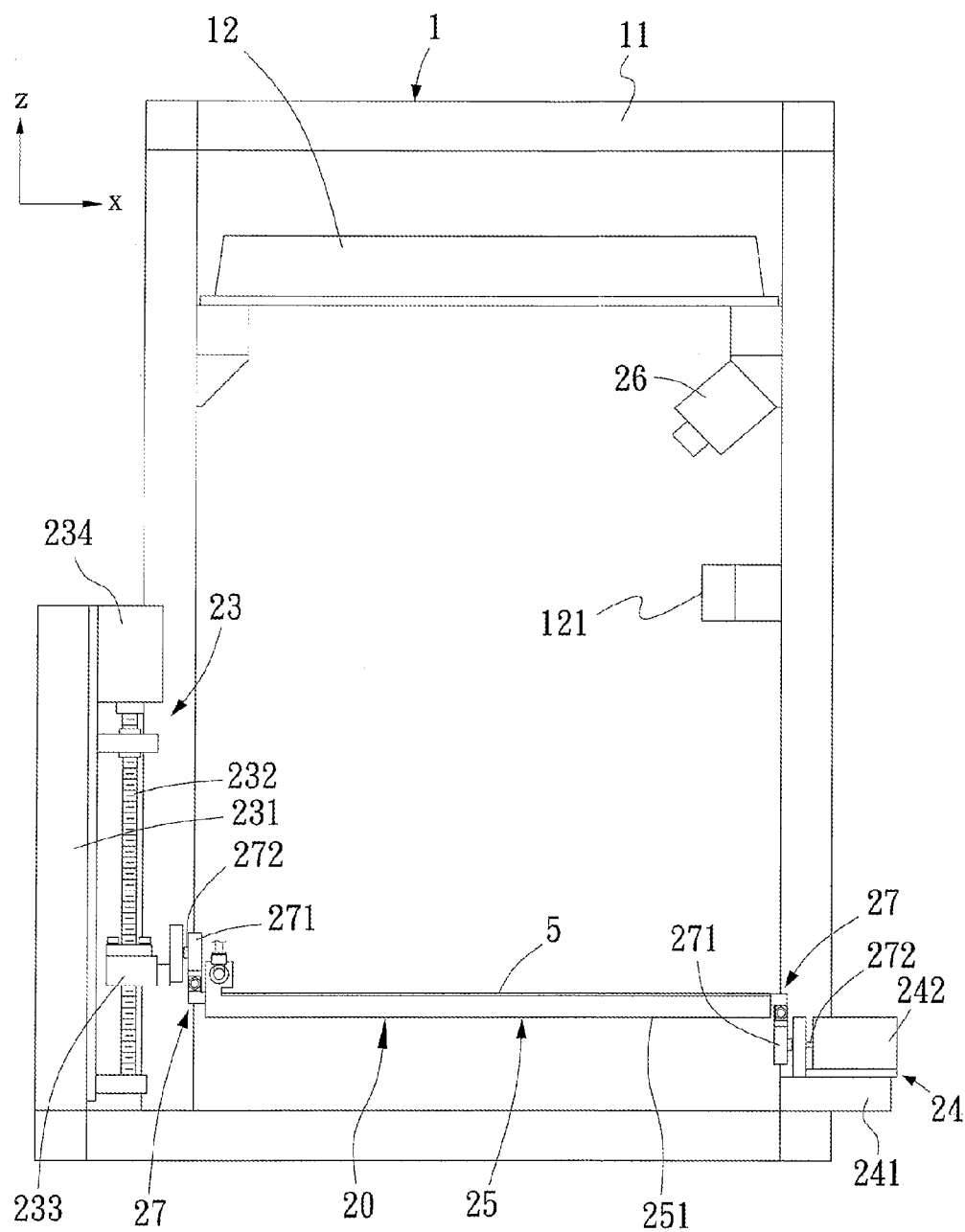
FIG. 5 is a side view of the preferred embodiment of the present invention, showing a water-cooling system thereof.
Figure 6:
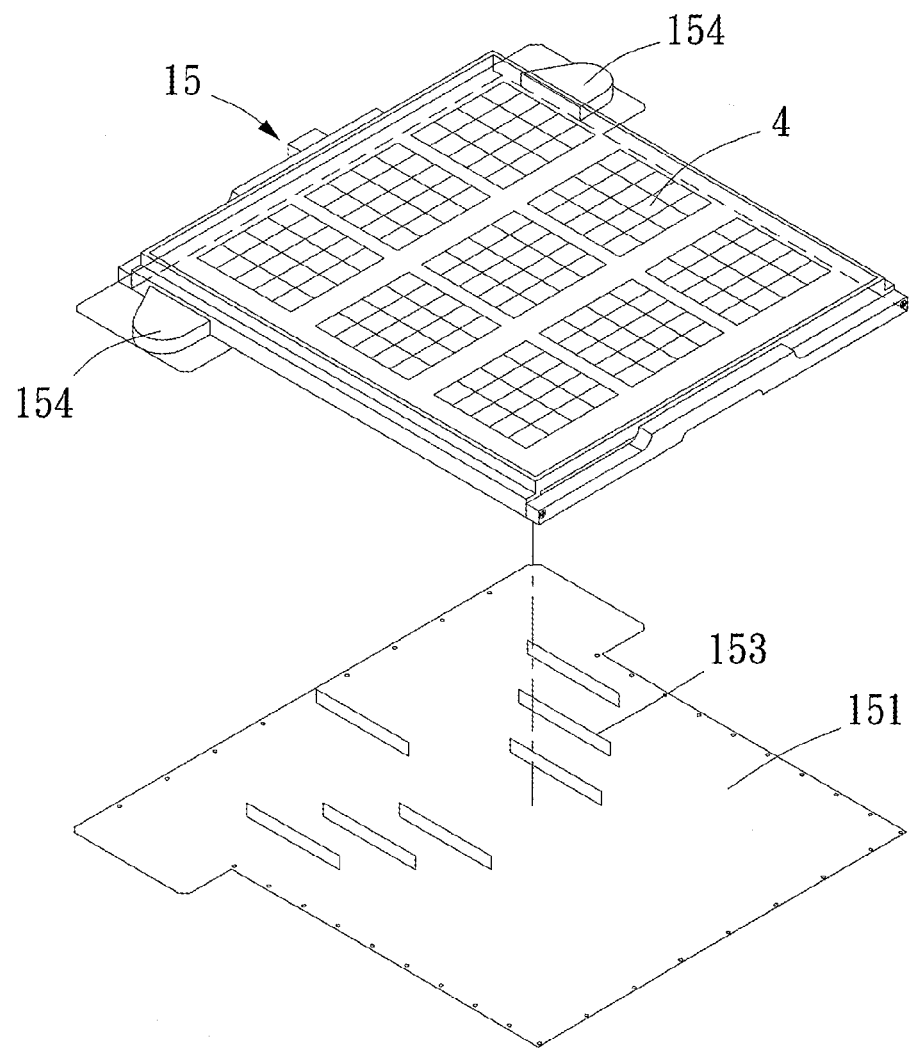
FIG. 6 is a perspective exploded view of the air-cooling system of the preferred embodiment of the present invention.
Figure 7:
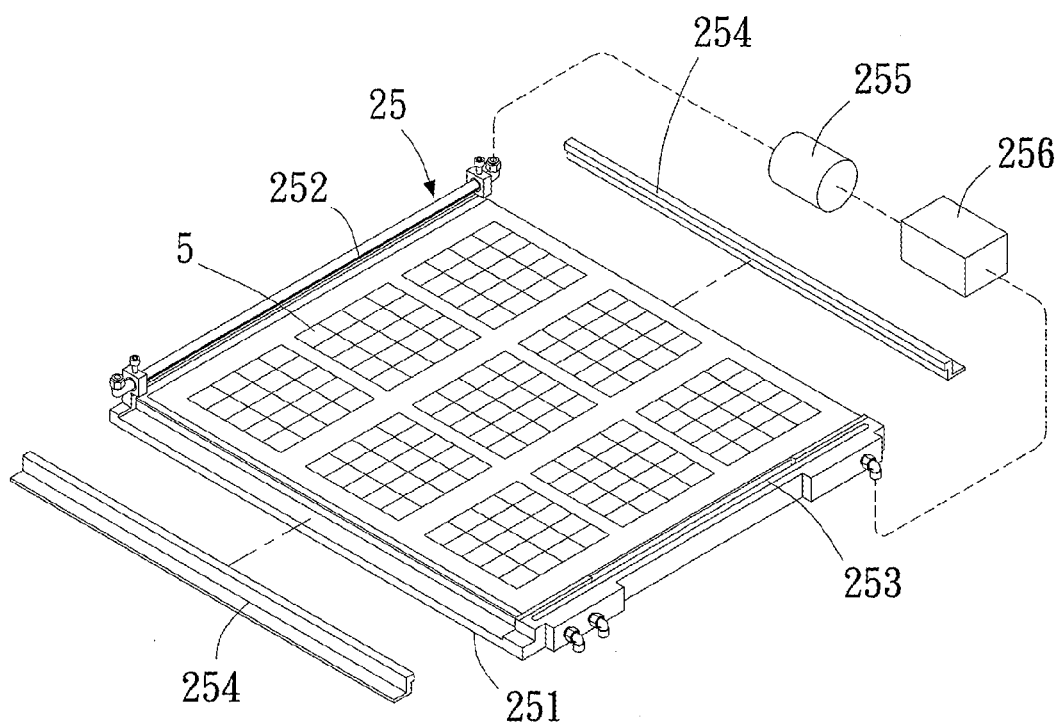
FIG. 7 is a perspective exploded view of the water-cooling system of the preferred embodiment of the present invention.

FIGS. 1 to 7 show a preferred embodiment of the present invention, in which FIG. 1 is a perspective view of the preferred embodiment of the present invention, FIG. 2 is an enlarged view of circled area a of FIG. 1, FIG. 3 is an enlarged view circled area b of FIG. 1, FIG. 4 is a side view of the preferred embodiment of the present invention, showing an air-cooling system thereof, FIG. 5 is a side view of the preferred embodiment of the present invention, showing a water-cooling system thereof, FIG. 6 is a perspective exploded view of the air-cooling system of the preferred embodiment of the present invention, and FIG. 7 is a perspective exploded view of the water-cooling system of the preferred embodiment of the present invention. As shown in the drawings, the solar photovoltaic panel test platform of the present invention includes a test section 1 and a signal processing section 3. The test section 1 has a frame 11, at least one light-emitting unit 12 disposed at a top end of the frame 11, a first angle adjustment unit 10 and a second angle adjustment unit 20 arranged on the frame 11, an air-cooling unit 15 mounted on the first angle adjustment unit 10, and a water-cooling unit 25 mounted on the second angle adjustment unit 20. The air-cooling unit 15 serves to connect with a first solar photovoltaic panel 4, while the water-cooling unit 25 serves to connect with a second solar photovoltaic panel 5. The frame 11 is designed with a structure for placing respective components thereon as practically required. The light-emitting unit 12 serves to provide different illuminations to simulate the sun. The signal processing section 3 is connected to the first and second angle adjustment units 10, 20, the light-emitting unit 12, the air-cooling unit 15, the water-cooling unit 25, the first solar photovoltaic panel 4 and the second solar photovoltaic panel 5. The signal processing section 3 serves to receive sensing signals of the first and second solar photovoltaic panels 4, 5 and transmit control signals to the first and second angle adjustment units 10, 20, the light-emitting unit 12, the air-cooling unit 15 and the water-cooling unit 25 so as to control heat dissipation amount and simulate angles of incidence and illuminations of the sun. In addition, the signal processing section 3 is connected to the first and second solar photovoltaic panels 4, 5 to measure the I-V curve and efficiency of the first and second solar photovoltaic panels 4, 5. The measured data are applicable to various solar photovoltaic panels installed on a building by different inclinations so as to achieve best utilization efficiency.

The first angle adjustment unit 10 has a first adjustment unit 13 and a first shaft seat 14 connected to the signal processing section 3. The second angle adjustment unit 20 has a second adjustment unit 23 and a second shaft seat 24 connected to the signal processing section 3. The air-cooling unit 15 is positioned between the first adjustment unit 13 and the first shaft seat 14. The water-cooling unit 25 is positioned between the second adjustment unit 23 and the second shaft seat 24. The signal processing section 3 controls the first adjustment unit 13 and the first shaft seat 14 to adjust rotational angles of the air-cooling unit 15 and the first solar photovoltaic panel 4 in X-axis and Y-axis so as to simulate various angles of incidence of the sun for the orientation limit of the building. Also, the signal processing section 3 controls the second adjustment unit 23 and the second shaft seat 24 to adjust rotational angles of the water-cooling unit 25 and the second solar photovoltaic panel 5 in X-axis and Y-axis so as to simulate various angles of incidence of the sun for the orientation limit of the building.

The air-cooling unit 15 has a first base 151, multiple spacer boards 153 and two fans 154. The spacer boards 153 are freely disposed on the first base 151. The fans 154 are respectively arranged on two sides of the first base 151 and connected to the signal processing section 3. The first solar photovoltaic panel 4 is disposed on the spacer boards 153 for supporting the first solar photovoltaic panel 4 and conducting heat. One of the fans 154 serves to guide cold air into the space between the first solar photovoltaic panel 4 and the first base 151. The guided in cold air goes through the spacer boards 153 to absorb waste heat from the back face of the first solar photovoltaic panel 4. The other of the fans 154 then guides the hot air outward. The signal processing section 3 serves to control the flow of the fans 154 to control heat dissipation amount. Furthermore, the spacer boards 153 can uniformly spread the guided in cold air over the space between the first solar photovoltaic panel 4 and the first base 151.

The first adjustment unit 13 has a first retainer seat 131 disposed on one side of the frame 11, a first adjustment threaded rod 132 movably disposed on the first retainer seat 131, a first main drive unit 134 disposed on the first retainer seat 131 for driving the first adjustment threaded rod 132 and a first slide seat 133 fitted on the first adjustment threaded rod 132. The first main drive unit 134 is connected to the signal processing section 3. The first shaft seat 14 has a first seat body 141 and a first subsidiary drive unit 142 disposed on the first seat body 141. The first subsidiary drive unit 142 is connected to the signal processing section 3. Two first pivot sections 17 are disposed on two sides of the first base 151 for movably connecting with the first adjustment unit 13 and the first shaft seat 14. Each first pivot section 17 has a first hinge seat 171 connected with the first base 151 and a first pivot shaft 172 movably disposed on the first hinge seat 171. The first pivot shafts 172 of the first pivot sections 17 are pivotally connected with the first slide seat 133 and connected with the first subsidiary drive unit 142 respectively. The signal processing section 3 serves to control the first subsidiary drive unit 142 to rotate the first pivot shaft 172 so as to adjust the rotational angles of the air-cooling unit 15 and the first solar photovoltaic panel 4 in X-axis. Also, the signal processing section 3 serves to control the first main drive unit 134 to rotate the first adjustment threaded rod 132, which drives the first slide seat 133 to adjust the rotational angles of the air-cooling unit 15 and the first solar photovoltaic panel 4 in Y-axis. Accordingly, various angles of incidence of the sun can be simulated.

The test section 1 further has a first thermal imager unit 16 arranged at the top end of the frame 11 and connected to the signal processing section 3. The first thermal imager unit 16 is positioned in adjacency to the light-emitting unit 12 to take pictures of the first solar photovoltaic panel 4. Under various illuminations provided by the first light-emitting unit 12 and various heat dissipation conditions provided by the air-cooling unit 15, the first thermal imager unit 16 takes pictures of the first solar photovoltaic panel 4 to show the surface temperature distribution thereof for further analysis.

The water-cooling unit 25 has a second base 251, a water outlet guide channel 252 arranged on one side of the second base 251, a water inlet guide channel 253 arranged on another side of the second base 251, two baffles 254 disposed on two other sides of the second base 251 respectively, and a pump 255 and a thermostated container 256 connected between the water outlet guide channel 252 and the water inlet guide channel 253. The pump 255 and the thermostated container 256 are connected to the signal processing section 3. The second solar photovoltaic panel 5 is disposed on the second base 251 and positioned between the water outlet guide channel 252 and the water inlet guide channel 253. The pump 255 serves to pump cooling water into the water outlet guide channel 253, whereby the cooling water flows through the surface of the second solar photovoltaic panel 5 to absorb waste heat and then flows into the water inlet guide channel 253. The signal processing section 3 serves to control the flow of the pump 255 so as to control heat dissipation amount. The baffles 254 serve to prevent the cooling water from flowing out from two sides of the second solar photovoltaic panel 5. The thermostated container 256 serves to control the temperature of the cooling water. The signal processing section 3 serves to control the cooling amount of the thermostated container 256 so as to control the heat dissipation amount.

The second adjustment unit 23 has a second retainer seat 231 disposed on the other side of the frame 11, a second adjustment threaded rod 232 movably disposed on the second retainer seat 231, a second main drive unit 234 disposed on the second retainer seat 231 for driving the second adjustment threaded rod 232 and a second slide seat 233 fitted on the second adjustment threaded rod 232. The second main drive unit 234 is connected to the signal processing section 3. The second shaft seat 24 has a second seat body 241 and a second subsidiary drive unit 242 disposed on the second seat body 241. The second subsidiary drive unit 242 is connected to the signal processing section 3. Two second pivot sections 27 are disposed on two sides of the second base 251 for movably connecting with the second adjustment unit 23 and the second shaft seat 24. Each second pivot section 27 has a second hinge seat 271 connected with the second base 251 and a second pivot shaft 272 movably disposed on the second hinge seat 271. The second pivot shafts 272 of the second pivot sections 27 are pivotally connected with the second slide seat 233 and connected with the second subsidiary drive unit 242 respectively. The signal processing section 3 serves to control the second subsidiary drive unit 242 to rotate the second pivot shaft 272 so as to adjust the rotational angles of the water-cooling unit 25 and the second solar photovoltaic panel 5 in X-axis. Also, the signal processing section 3 serves to control the second main drive unit 234 to rotate the second adjustment threaded rod 232, which drives the second slide seat 233 to adjust the rotational angles of the water-cooling unit 25 and the second solar photovoltaic panel 5 in Y-axis. Accordingly, various angles of incidence of the sun can be simulated.

The test section 1 further has a second thermal imager unit 26 arranged at the top end of the frame 11 and connected to the signal processing section 3. The second thermal imager unit 26 is positioned in adjacency to the second light-emitting unit 22 to take pictures of the second solar photovoltaic panel 5. Under various illuminations provided by the second light-emitting unit 22 and various heat dissipation conditions provided by the water-cooling unit 25, the second thermal imager unit 26 takes pictures of the second solar photovoltaic panel 5 to show the surface temperature distribution thereof for further analysis.

The test section 1 further has a radiation amount pickup unit 121. The radiation amount pickup unit 121 is disposed on the frame 11 for measuring the radiation amount of the light-emitting unit 12 and transmitting the measured radiation amount to the signal processing section 3. The wavelength of the light emitted from the light-emitting unit 12 ranges from 200 nm to 1200 nm in approximation to sunlight. The light-emitting unit 12 can be a xenon arc light, a UV light or a halogen lamp. The light-emitting unit 12 can be horizontally moved to a lateral side of the frame 11. In this case, sunlight can be directly projected upon the first and second solar photovoltaic panels 4, 5 to measure the I-V curves and efficiency thereof.

The signal processing section 3 further has a human-machine interface (HMI) 31 and a display unit 32 for processing, transmitting and displaying the data of the received signals.

The signal processing section 3 is connected to the first angle adjustment unit 10, the second angle adjustment unit 20, the light-emitting unit 12, the air-cooling unit 15, the water-cooling unit 25, the first thermal imager unit 16, the second thermal imager unit 26, the first solar photovoltaic panel 4 and the second solar photovoltaic panel 5. The signal processing section 3 serves to record the sensing signals transmitted back from the first thermal imager unit 16, the second thermal imager unit 26, the first solar photovoltaic panel 4 and the second solar photovoltaic panel 5. According to the sensing signals, the signal processing unit 3 transmits control signals to the first angle adjustment unit 10, the second angle adjustment unit 20, the light-emitting unit 12, the air-cooling unit 15 and the water-cooling unit 25 to simulate various sunlight incidence conditions and find out to which extent the air-cooling unit 15 and the water-cooling unit 25 should provide heat dissipation mode for the first and second solar photovoltaic panels 4, 5 to achieve best efficiency.

Figure 8:
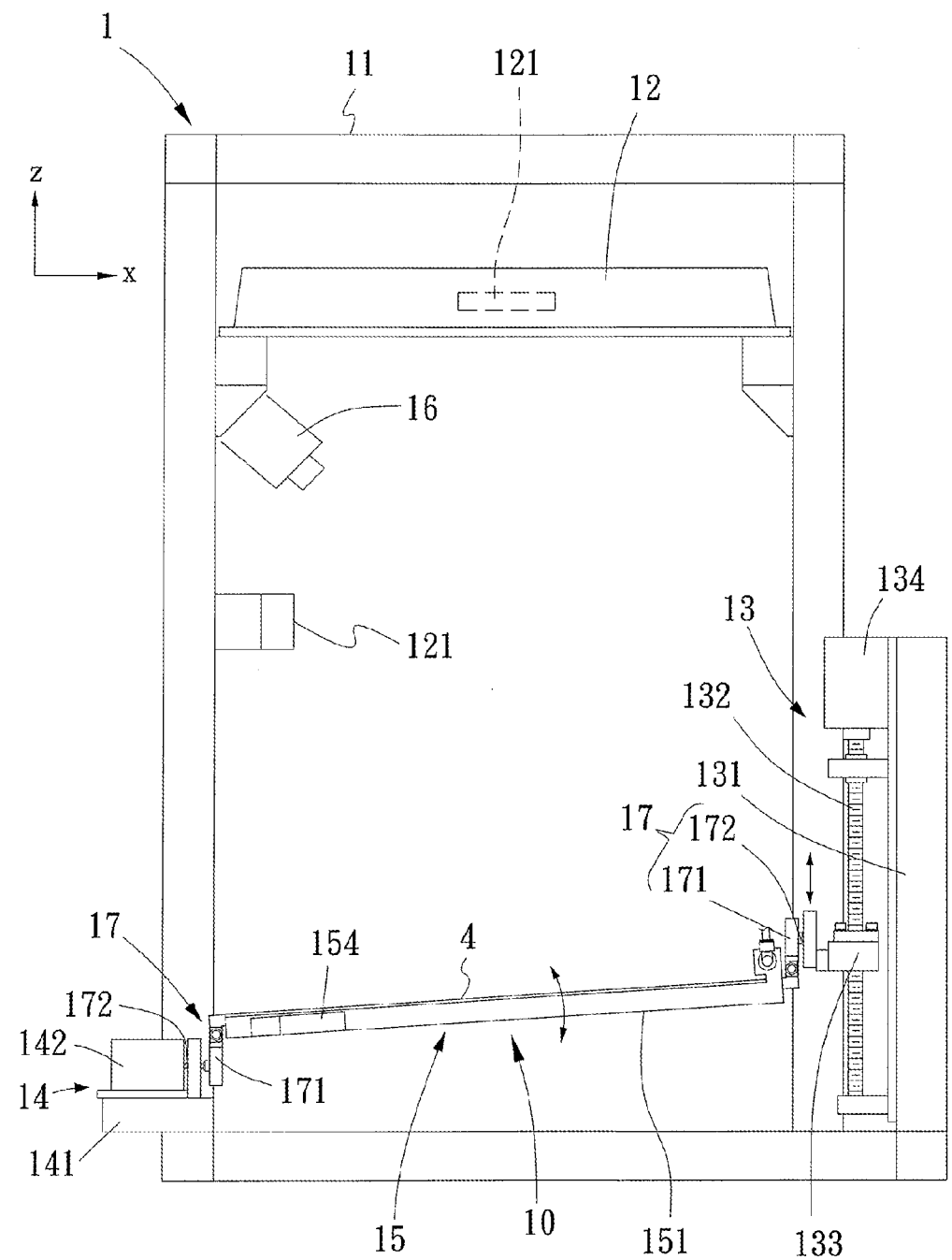
FIG. 8 shows the operation of a first angle adjustment unit of the preferred embodiment of the present invention.
Figure 9:
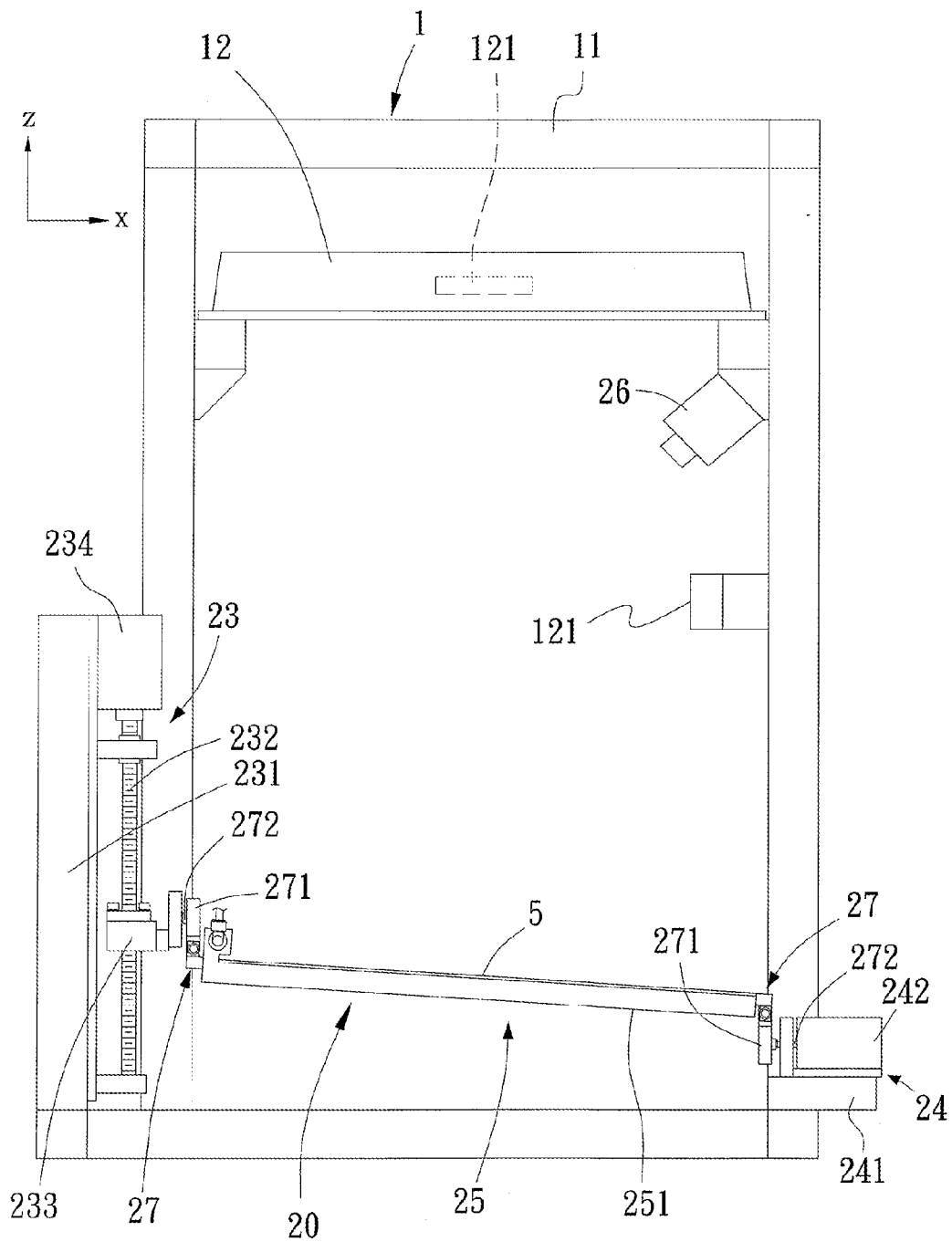
FIG. 9 shows the operation of a second angle adjustment unit of the preferred embodiment of the present invention.
Figure 10:
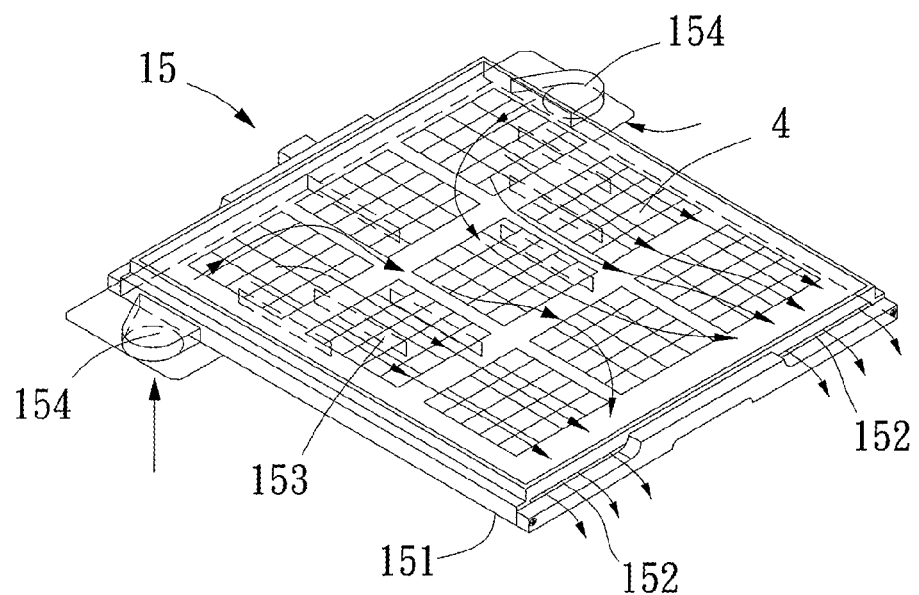
FIG. 10 shows the operation of the air-cooling unit of the preferred embodiment of the present invention.
Figure 11:
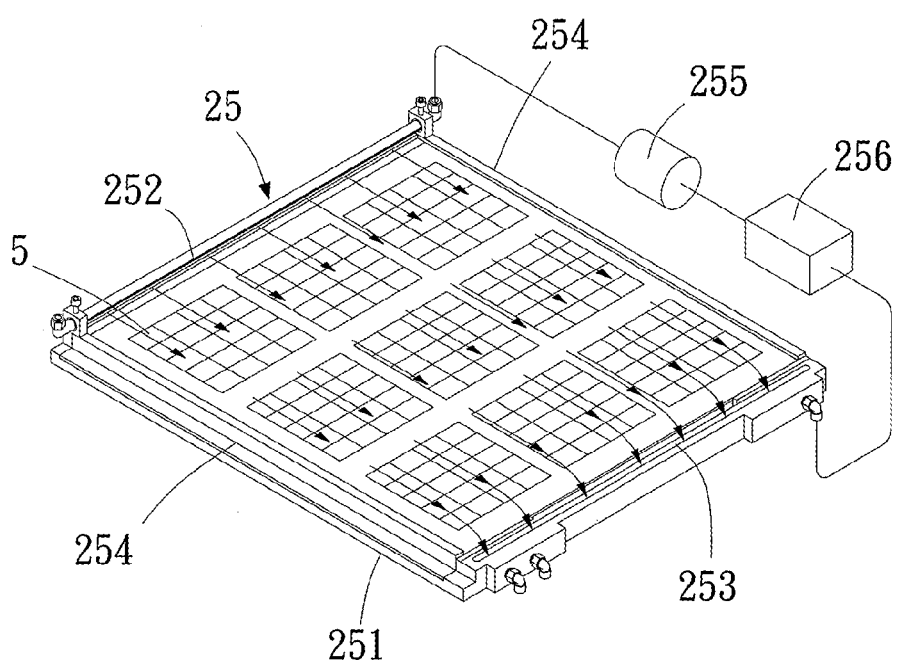
FIG. 11 shows the operation of the water-cooling unit of the preferred embodiment of the present invention.

FIG. 8 shows the operation of the first angle adjustment unit, FIG. 9 shows the operation of the second angle adjustment unit, FIG. 10 shows the operation of the air-cooling unit, and FIG. 11 shows the operation of the water-cooling unit of the present invention. As shown in the drawings, in operation of the present invention (also with reference to FIGS. 1 to 7), the first and second solar photovoltaic panels 4, 5 are respectively positioned on the faces of the first and second bases 151, 251 on which the air-cooling unit 15 and the water-cooling unit 25 are mounted. The first solar photovoltaic panel 4 is aligned with the light-emitting unit 12 and the first thermal imager unit 16, while the second solar photovoltaic panel 5 is aligned with the light-emitting unit 12 and the second thermal imager unit 26. The light-emitting units 12 serve to simulate the sun to project light upon the first and second solar photovoltaic panels 4, 5. The first and second thermal imager units 16, 26 serve to sense the thermal images and surface temperatures of the first and second solar photovoltaic panels 4, 5. In test, the signal processing section 3 controls the first and second angle adjustment units 10, 20 to adjust the angles contained between the first and second solar photovoltaic panels 4, 5 and the light-emitting units 12. In adjustment, the signal processing unit 3 controls the first main drive unit 134 and the second main drive unit 234 to rotate the first and second adjustment threaded rods 132, 232 on the first and second retainer seats 13, 23. At this time, the first and second adjustment threaded rods 132, 232 drive the first and second slide seats 133, 233 upward or downward. Simultaneously, the first and second slide seats 133, 233 drive the first and second pivot sections 17, 27 on the lateral sides of the air-cooling unit 15 and the water-cooling unit 25 to incline the air-cooling unit 15 and the water-cooling unit 25 about the cooperative first and second hinge seats 171, 271 by a certain angle in Y-axis. Also, the signal processing unit 3 controls the first subsidiary drive unit 142 and the second subsidiary drive unit 242 to rotate the first and second pivot shafts 172, 272. The first pivot shafts 172 are disposed on two sides of the air-cooling unit 15 and pivotally connected with the first slide seat 133 and the first shaft seat 14. The second pivot shafts 272 are disposed on two sides of the water-cooling unit 25 and pivotally connected with the second slide seat 233 and the second shaft seat 24 respectively. Accordingly, the air-cooling unit 15 and the water-cooling unit 25 can be inclined about the first and second pivot shafts 172, 272 by a certain angle in X-axis. Therefore, various angles of incidence of sunlight can be simulated for testing the efficiency of the first and second solar photovoltaic panels 4, 5.

When testing and measuring the efficiency and surface temperatures of the first and second solar photovoltaic panels 4, 5, the air-cooling unit 15 and the water-cooling unit 25 are used to lower the temperatures of the first and second solar photovoltaic panels 4, 5. The signal processing section 3 makes the fans 154 of the air-cooling unit 15 suck and guide external cold air into the interior of the air-cooling unit 15. The spacer boards 153 serve to spread the cold air and prolong detention time thereof. The hot air is then exhausted from the outlets 152 on the other side of the air-cooling unit 15 to complete an air-cooling heat exchange process. On the other hand, the signal processing section 3 makes the pump 255 of the water-cooling unit guide the cooling water out of the thermostated container 256 to the water outlet guide channel 252. The cooling water then flows downward from the water outlet guide channel 252 through the surface of the second solar photovoltaic panel 5 for heat exchange so as to lower the temperature of the second solar photovoltaic panel 5. The cooling water is restricted and guided by the left and right baffles 254 to absorb heat and become warm water. The warm water is collected in the water inlet guide channel 253 and transferred to the thermostated container 256 for lowering the temperature so as to complete a thermal cycle. The cooling water is then again pumped to the water outlet guide channel 252 by means of the pump 25 for reuse.

In addition, in the test, the air-cooling unit 15 can be stopped when operating to measure the I-V curve and efficiency of the first solar photovoltaic panel 4 without being cooled. Also, in the test, the water-cooling unit 25 can be stopped when operating to measure the I-V curve and efficiency of the second solar photovoltaic panel 5 without being cooled.

In operation of the first and second angle adjustment units 10, 20, the light-emitting unit 12, the air-cooling unit 15, the water-cooling unit 25, the first thermal imager unit 16 and the second thermal imager unit 26, a user can perform setting operation by means of the signal processing unit 3. Moreover, after tested, the data, such as the amount of the cooling air, the cooling water flow, the temperature, the peak sun hour, and the voltage, current and temperature of the solar photovoltaic panels, are transmitted to the signal processing section 3 to produce the efficiency test curves of the solar photovoltaic panels. Accordingly, the solar photovoltaic panel test platform of the present invention serves as an automatic test system.

In conclusion, with the test section and the signal processing section, the present invention is able to simulate the illuminations and angles of incidence of the sun for the orientation limit of the building and adjust the heat dissipation amount. Accordingly, the efficiency of the solar photovoltaic panels can be tested in different illuminations, angles of incidence and heat dissipation modes.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A solar photovoltaic panel test platform comprising:
a test section, the test section having a frame, at least one light-emitting unit disposed at a top end of the frame, a first angle adjustment unit and a second angle adjustment unit arranged on the frame, an air-cooling unit mounted on the first angle adjustment unit, and a water-cooling unit mounted on the second angle adjustment unit, the first angle adjustment unit having a first adjustment unit and a first shaft seat, the second angle adjustment unit having a second adjustment unit and a second shaft seat, the air-cooling unit being positioned between the first adjustment unit and the first shaft seat for connecting with a first solar photovoltaic panel, the water-cooling unit being positioned between the second adjustment unit and the second shaft seat for connecting with a second solar photovoltaic panel; and
a signal processing section connected to the first adjustment unit, the first shaft seat, the second adjustment unit, the second shaft seat, the light-emitting unit, the air-cooling unit, the water-cooling unit, the first solar photovoltaic panel and the second solar photovoltaic panel, the signal processing section serving to receive sensing signals and transmit control signals to measure I-V curves and efficiency of the first and second solar photovoltaic panels.

2. The solar photovoltaic panel test platform as claimed in claim 1, wherein the first adjustment unit has a first retainer seat disposed on the frame, a first adjustment threaded rod movably disposed on the first retainer seat, a first main drive unit disposed on the first retainer seat for driving the first adjustment threaded rod and a first slide seat fitted on the first adjustment threaded rod, the first main drive unit being connected to the signal processing section, the first shaft seat having a first seat body and a first subsidiary drive unit disposed on the first seat body, the first subsidiary drive unit being connected to the signal processing section, two first pivot sections being disposed on two sides of a first base for movably connecting with the first adjustment unit and the first shaft seat, each first pivot section having a first hinge seat connected with the first base and a first pivot shaft movably disposed on the first hinge seat, the first pivot shafts of the first pivot sections being pivotally connected with the first slide seat and connected with the first subsidiary drive unit respectively.

3. The solar photovoltaic panel test platform as claimed in claim 2, wherein the air-cooling unit has the first base, multiple spacer boards disposed on the first base and two fans arranged on two sides of the first base, the two fans being connected to the signal processing section, the first base being disposed between the first adjustment unit and the first shaft seat.

4. The solar photovoltaic panel test platform as claimed in claim 3, wherein the test section further has a first thermal imager unit, the first thermal imager unit being arranged at the top end of the frame and connected to the signal processing section.

5. The solar photovoltaic panel test platform as claimed in claim 1, wherein the second adjustment unit has a second retainer seat disposed on the frame, a second adjustment threaded rod movably disposed on the second retainer seat, a second main drive unit disposed on the second retainer seat for driving the second adjustment threaded rod and a second slide seat fitted on the second adjustment threaded rod, the second main drive unit being connected to the signal processing section, the second shaft seat having a second seat body and a second subsidiary drive unit disposed on the second seat body, the second subsidiary drive unit being connected to the signal processing section, two second pivot sections being disposed on two sides of a second base for movably connecting with the second adjustment unit and the second shaft seat, each second pivot section having a second hinge seat connected with the second base and a second pivot shaft movably disposed on the second hinge seat, the second pivot shafts of the second pivot sections being pivotally connected with the second slide seat and connected with the second subsidiary drive unit respectively.

6. The solar photovoltaic panel test platform as claimed in claim 5, wherein the water-cooling unit has the second base, a water outlet guide channel arranged on one side of the second base, a water inlet guide channel arranged on another side of the second base, two baffles disposed on two other sides of the second base respectively, and a pump and a thermostated container connected between the water outlet guide channel and the water inlet guide channel, the pump and the thermostated container being connected to the signal processing section, the second base being disposed between the second adjustment unit and the second shaft seat.

7. The solar photovoltaic panel test platform as claimed in claim 6, wherein the test section further has a second thermal imager unit, the second thermal imager unit being arranged at the top end of the frame and connected to the signal processing section.

8. The solar photovoltaic panel test platform as claimed in claim 1, wherein the test section further has a radiation amount pickup unit for measuring radiation amount of the light-emitting unit and transmitting the measured radiation amount to the signal processing section.

9. The solar photovoltaic panel test platform as claimed in claim 1, wherein the wavelength of the light emitted from the light-emitting unit ranges from 200 nm to 1200 nm.

10. The solar photovoltaic panel test platform as claimed in claim 9, wherein the light-emitting unit is a xenon arc light, a UV light or a halogen lamp.

11. The solar photovoltaic panel test platform as claimed in claim 1, wherein the light-emitting unit can be horizontally moved to a lateral side of the frame, whereby sunlight can be directly projected upon the first and second solar photovoltaic panels to measure the I-V curves and efficiency thereof.

12. The solar photovoltaic panel test platform as claimed in claim 1, wherein the signal processing section further has a human-machine interface and a display unit.

13. The solar photovoltaic panel test platform as claimed in claim 1, wherein the air-cooling unit can be stopped when operating to measure the I-V curve and efficiency of the first solar photovoltaic panel without being cooled.

14. The solar photovoltaic panel test platform as claimed in claim 1, wherein the water-cooling unit can be stopped when operating to measure the I-V curve and efficiency of the second solar photovoltaic panel without being cooled.

* * * * *